United States Patent [19]
Vassiliev et al.

[11] Patent Number: 6,070,831
[45] Date of Patent: Jun. 6, 2000

[54] AIRCRAFT FOR PASSENGER AND/OR CARGO TRANSPORT

[76] Inventors: Anatoli J. Vassiliev, Abondrothstrasse 11, 50769 Koln; Karl-Heinz Eibel, Boisdorfer Strasse 17, 50169 Kerpen-Horrem, both of Germany

[21] Appl. No.: 09/018,959

[22] Filed: Feb. 5, 1998

[30] Foreign Application Priority Data

May 2, 1997 [DE] Germany .......................... 197 04 188
Nov. 3, 1997 [DE] Germany .......................... 197 09 921

[51] Int. Cl.$^7$ ...................................................... B64C 1/30
[52] U.S. Cl. ........................ 244/120; 244/119; 244/117 R
[58] Field of Search .................... 244/119, 120, 244/117 R, 118.1, 118.2, 118.5

[56] References Cited

U.S. PATENT DOCUMENTS

| | | | |
|---|---|---|---|
| 2,597,563 | 5/1952 | Breazeale, Jr. ........................... | 244/118 |
| 2,697,569 | 12/1954 | Westcott, Jr. ............................ | 244/118 |
| 3,481,567 | 12/1969 | Stearman ................................. | 244/118 |
| 4,165,058 | 8/1979 | Whitener . | |
| 4,390,150 | 6/1983 | Whitener . | |
| 4,417,708 | 11/1983 | Negri .................................... | 244/45 R |
| 4,449,679 | 5/1984 | McComas .............................. | 244/118.2 |

FOREIGN PATENT DOCUMENTS

1556079  11/1979  United Kingdom .

*Primary Examiner*—Peter M. Poon
*Assistant Examiner*—Vagnola K. Comer
*Attorney, Agent, or Firm*—Antonelli, Terry, Stout & Kraus, LLP

[57] ABSTRACT

Aircraft for carrying passengers and/or freight based on a known aircraft design with a fuselage having a nose section, center section, and tail section and with airfoils mounted on the center section near the center of gravity of the aircraft and calculated for the required lift and with vertical and/or horizontal stabilizers located in the vicinity of the tail section for creating stabilizing and steering moments, with the fuselage of said aircraft being stretched by means of an additional section inserted between the nose section and the center of gravity of the aircraft model in order to increase the carrying capacity of the aircraft based on predetermined known aircraft designs, and with the additional section, as viewed in the direction of flight, being equipped forward of the airfoils of the aircraft model that serve as the main airfoils with airfoils that serve as additional airfoils, with previously designed and calculated airfoils of suitable size from a known aircraft design being used as the additional airfoils.

16 Claims, 8 Drawing Sheets

AIRCRAFT FOR PASSENGER AND/OR CARGO TRANSPORT

BACKGROUND OF THE INVENTION

The invention relates to an aircraft for passenger and/or cargo transport based on a known aircraft design, with a fuselage having a nose section, center section, and tail section, and with airfoils mounted on the center section near the center of gravity of the aircraft and calculated for the required lift, and with horizontal and/or vertical control surfaces located in the vicinity of the tail section to generate stabilizing and steering moments.

Aircraft of the species recited at the outset constitute a standard design and are known as designs of different sizes used for passenger and/or cargo aircraft.

In view of steadily increasing demands for economic operation of such passenger and/or cargo aircraft as well as steadily increasing air traffic, efforts are being made to increase the size of aircraft as far as their carrying capacity is concerned, in other words the number of passengers to be carried or their cargo capacity.

In the past this was achieved primarily by developing new aircraft with ever-larger fuselage dimensions, with correspondingly larger carrying capacity, said aircraft having to be equipped with correspondingly ever larger airfoils to provide the required lift.

In this connection, the recalculation and redesign of the airfoils of an aircraft involve extremely high cost and many years of development.

Another approach to increasing carrying capacity has in the past involved improving a known aircraft design by stretching the fuselage both fore and aft of the center of gravity of the aircraft design that is known and serves as the basis. The larger airfoils required for producing the necessary lift are again recalculated and designed, thus incurring very high costs, since the redesign of airfoils and their calculation involve considerable expense.

Another significant disadvantage of this approach to increasing the carrying capacity of a known aircraft design, in addition to its high cost, consists in the limitations imposed by the design on the possibilities for enlarging the airfoils and lengthening the fuselage aft of the center of gravity, in other words, toward the tail section of the fuselage, since the takeoff angle of the aircraft is reduced as a result, so that such an aircraft would require impossibly long runways.

BRIEF SUMMARY OF THE INVENTION

Hence the goal of the invention is to provide an aircraft with an increased carrying capacity that can be made ready for mass production at the lowest possible cost and within a short space of time, while good flight characteristics are achieved at the same time.

The solution according to the invention to the problem posed above provides that in order to increase the carrying capacity of the aircraft, beginning with a predetermined known aircraft design, the fuselage of said aircraft is stretched by an additional section inserted between the nose section and the center of gravity of the aircraft design, with said additional section, as viewed in the direction of flight, being provided forward of the airfoils of the aircraft design that serve as the main airfoils, with airfoils that serve as additional airfoils, with already designed and calculated airfoils of suitable size of a known aircraft design being used as the additional airfoils.

According to the invention, therefore, stretching the fuselage to increase the carrying capacity of the aircraft by incorporating an additional fuselage section as an additional section is performed exclusively forward of the center of gravity of the known aircraft design that serves as the basis, so that no reduction of the takeoff angle must be accepted by comparison with the aircraft design that serves as the basis. In addition, the airfoils of the aircraft that serve as the basis are retained unchanged in the aircraft according to the invention and serve as the main airfoils of the new aircraft. The increase in the size of the airfoils required by the increase in carrying capacity, in order to provide sufficient lift, is provided according to the invention by airfoils called additional airfoils in addition to the existing airfoils, said additional airfoils being mounted forward of the main airfoils on the additional section, looking in the direction of flight.

Aircraft with two pairs of airfoils mounted one aft of the other looking in the direction of flight are already known in theory, from U.S. Pat. No. 4,390,150 for example.

However, the invention teaches that, especially to achieve the goal stated at the outset, namely of producing an aircraft with an increased carrying capacity that can be readied for mass production at especially low development costs and in a short time, said aircraft being composed of already existing and calculated and already designed components for the fuselage and especially the two pairs of airfoils. The already designed and calculated airfoils of suitable size from a known aircraft design are used as the additional airfoils. At the same time, no changes are required in the main airfoils relative to the aircraft design that serves as the basis. Depending on the degree of increase in carrying capacity of the aircraft according to the invention, the required additional airfoils can be provided by a known aircraft model of suitable size. The airfoils used as the main airfoils on the aircraft according to the invention can also be used as the additional airfoils.

Hence, the invention teaches that an aircraft, equipped in this manner with an added additional section with additional airfoils and with a stretched fuselage, based on an aircraft design known of itself, despite its increased carrying capacity, can remain unchanged as regards the size and shape of its main airfoils. The required increase in the size of the airfoils resulting from the increased carrying capacity of the aircraft is achieved solely by virtue of the fact that additional airfoils are mounted on the additional section forward of the main airfoils, resulting in a use of already calculated and tested airfoils of an additional known aircraft design of suitable size. Since both the main airfoils and the additional airfoils are thus derived from already-known aircraft designs, no new costly design or recalculation of the wing profiles of the airfoils is necessary in the aircraft according to the invention, thus producing a significant decrease in cost over previously known aircraft with increased carrying capacity. This cost reduction is intensified even further by the fact that not only the already designed and calculated airfoils but also the operating equipment adapted and tested with them can be adopted almost completely from the known aircraft designs that provide the main and additional airfoils.

One advantageous embodiment of the invention provides that the fuselage of the aircraft is assembled from modules, with a module forming the nose section, a module forming the tail section, a plurality of modules forming the center section, and a module forming the additional section, with the main airfoils being mounted on one of the modules that form the center section. The fuselage of a known aircraft design can be stretched in very simple fashion by incorporating an additional section, thanks to the modular design of the fuselage. Preferably, a suitable fuselage module of the known aircraft design that serves as the basis is used as the additional section for stretching the modular fuselage, advantageously the one provided with the mounting elements for the airfoils, so that the additional airfoils can be attached in simple fashion to the additional section formed by this fuselage module, reducing additional expense as a result.

Moreover, within the scope of the invention, it has also been found that especially low flow resistance and especially low mutual influences between the additional airfoils and the main airfoils are achieved when the additional airfoils are located as far forward of the main airfoils as possible. According to one proposal of the invention, this can be accomplished by locating the additional section with the additional airfoils immediately adjacent to the nose section.

As a result of the additional section inserted into the fuselage forward of the center of gravity and the additional airfoils fastened to said additional section, the center of gravity of the aircraft is shifted forward as viewed in the direction of flight, but the additional airfoils together with the unchanged main airfoils produce the necessary lift and compensate for the resultant shift in the center of gravity.

In order to be able to retain conventional and proven horizontal takeoff as used by the known aircraft designs, in the proposed aircraft according to the invention, it is proposed that the effective wing area of the additional airfoils be smaller than or at most equal to the effective wing area of the main airfoils. From this it follows that the additional airfoils are adopted either from an aircraft design that is smaller than the aircraft design that serves as the basis, or correspond to the main airfoils to produce an effective wing area that is the same size at most.

In any event, however, the additional airfoils offer an extraordinarily low inductive resistance to the air flow around them, since they can be made "aerodynamically clean," in other words all of the structures that hinder flow such as pylons, engines, etc. are absent from the additional airfoils.

The aircraft according to the invention produced in this fashion has additional airfoils located forward of the main airfoils, said additional airfoils contributing at least 15% and preferably at least 20% to the total lift of the aircraft. Thus the aircraft according to the invention also differs considerably from so-called "canard aircraft" that have been tested experimentally, in which the front wings located in the forward fuselage area merely act as a forward stabilizer to create steering moments and make only a very small contribution to the total lift.

The additional airfoils mounted forward of the main airfoils and fastened to the additional section, according to another embodiment of the invention, not only can be used to produce the required lift together with the main airfoils but can also generate steering moments for the aircraft. For this purpose it is proposed that the additional airfoils, as viewed in the direction of flight, be provided at their leading and/or trailing edges with control flaps extending over the entire width of the additional airfoils. For example it is possible to use the wing flaps and the leading edge flaps provided at the additional airfoils to produce lift and steering moments. It is also possible, instead of the leading edge flaps usually installed at the leading edges of airfoils, to employ so-called "Kruegger flaps" with which steering moments for maneuvering the aircraft according to the invention can be produced.

The steering moments that can be produced with the aid of the additional airfoils and the flaps provided thereon, depending on the size of the additional airfoils, can act to reinforce the effects of the aircraft stabilizers usually located in the vicinity of the tail section, and it is also possible, with suitably large additional airfoils, to eliminate the stabilizers in the vicinity of the tail section of the aircraft and to produce steering moments solely by means of the flaps of the additional airfoils. This further decreases the inductive resistance of the aircraft according to the invention.

In any event, however, by creating steering moments in the vicinity of the additional airfoils, the maneuverability of the aircraft according to the invention is increased considerably by contrast with an aircraft of conventional design.

In addition to this increase in maneuverability, the aircraft according to the invention also undergoes an increase in its cruising lift/drag ratio of at least 20 to 25%, since the design of the additional airfoils results in a considerable increase in the length of the wings and hence a reduction of inductive resistance. Another important advantage is that the additional airfoils produce a positive lift in the forward area of the aircraft instead of a negative lift at the tail assembly, as is the case in aircraft of conventional design. Consequently, balancing the aircraft in flight is considerably simplified and the losses in lift/drag ratio as a result of unnecessary generation of balance moments that have a disadvantageous effect on fuel consumption are reduced.

In addition, trimming and balancing of the aircraft according to the invention for the takeoff configuration is considerably facilitated by the additional airfoils located in the forward fuselage area and the lift created at this point. The lift/drag ratio at takeoff is increased, and lift/drag ratio losses are reduced. Therefore, it has been shown within the scope of the invention that the aircraft proposed according to the invention, with the aid of the additional airfoils mounted in the forward fuselage area, needs a much shorter distance for takeoff and landing because of the reduction of lift losses, further improving the economics of operation of the aircraft according to the invention.

Another important advantage is that the fuselage stretched according to the invention by adding an additional section forward of the center of gravity in an aircraft provided with additional airfoils located forward of the center of gravity offers a great increase in safety since the additional airfoils permit a considerable increase in protection against spins and a reduction of the critical speed, while at the same time the damping of vibrations of the aircraft according to the invention during flight involving considerable atmospheric turbulence for example is increased.

Since it is not necessary to enlarge the known airfoils used in the aircraft according to the invention as the main airfoils and additional airfoils, the specific design weight of these airfoils is not increased either so that the specific weight per $m^2$ of total wing area is reduced, further reducing the cost of manufacturing the aircraft.

Another increase in carrying capacity of the aircraft according to the invention can be provided by virtue of the fact that the fuselage of said aircraft is designed areawise and preferably symmetrically with respect to the center of gravity on two levels, and is increased in size in this manner. For this purpose, the fuselage has an upper deck that forms the second level, said upper deck advantageously being based on the fuselage modules of a known smaller aircraft design or one of the same size by comparison to the aircraft model that serves as the basis. In this manner, the necessary design and construction costs can again be kept low. The provision of the upper deck symmetrically with respect to the center of gravity of the aircraft according to the invention means that the bilevel fuselage thus produced does not produce any shifting of the center of gravity in the direction of flight and hence does not influence the flight characteristics of the aircraft. Moreover it has been found that simple areawise provision of a bilevel fuselage for the aircraft symmetrically with respect to its center of gravity is especially advantageous from the aerodynamic standpoint and produces only a low inductive resistance to airflow.

The aircraft for passenger and/or cargo transport with increased carrying capacity according to the invention is designed for subsonic speed and advantageously has additional and main airfoils mounted below the longitudinal axis of the fuselage and on both sides of the center of gravity of the aircraft. According to an advantageous embodiment of the invention, different values for angles of incidence of the airfoils and the horizontal control surfaces with respect to the horizontal and the longitudinal axis of the fuselage in cruising configuration of the aircraft can be provided, for increasing the cruising lift/drag ratio and lift at take off and landing and for increasing the flight stability in a wide range of working and side flight angles. Preferably the angles of incidence from the additional airfoils to the main airfoils and from the main airfoils to the horizontal control surfaces pass over to lower values so that the additional airfoils have a larger angle of incidence than the main airfoils and the main airfoils have a larger angle of incidence than the horizontal control surfaces. Furthermore, it is preferred that the angle of incidence of the horizontal control surfaces of 0°, whereby preferably the angle of incidence of the additional airfoils is 4° and the angle of incidence of the main airfoils is 2°, with all values related to the longitudinal axis of the fuselage and in cruising configuration. Hereby the lift/drag ratio and the longitudinal stability of the aircraft according to the invention is increased.

In another advantageous embodiment of the invention it is provided that the wing spread of the additional airfoils in its size lies between the wing of the horizontal control surfaces and the wing spread of the main airfoils, whereby the additional airfoils have an enlarged transversal wing angle "V" of preferably 5 to 10° in comparison with the main airfoils and, as viewed in the direction of flight, the top edge at the outer end of the additional airfoils is provided on the same or an higher level as the surface of the main airfoils. In this way and in connection with the maximal enlarged length of the fuselage and the large distance of the additional airfoils from the center of gravity of the aircraft according to the invention an effective increase in stability and protection against spins of the aircraft according to the invention is effected.

Preferably the additional airfoils and the main airfoils are located in a middle distance of each other that corresponds at least to the five foil of the respective local width of the additional airfoils. By these dimensions, negative influences of end turbulence of air that flows around the additional airfoils to the main airfoils and/or horizontal control surfaces are reduced.

In another advantageous embodiment of the invention for increasing the lift at take off and landing it is provided that the additional airfoils are pivoted around their longitudinal axis to the fuselage, i.e., with regard to the transverse axis of the aircraft, so that an enlargement of the angle of incidence of the additional airfoils can be effected.

An exceptionally large increase of flight stability and also maximum enlargement of the internal volume of the fuselage and therefore enlargement of its carrying capacity is achieved by enlargement of the fuselage in inventive manner to its maximum approved length with regard to design and utilization conditions. Herewith the fuselage-stretch is at least 12 and preferably 12 to 14.

In case that the fuselage is designed on two levels with an upper deck for increasing the carrying capacity, this preferably is provided in an area between the additional airfoils and the main airfoils on both sides of the center of gravity according to the demand of the surface rule, whereby an advantageous reduction in wave resistance of the aircraft according to the invention is effected.

BRIEF DESCRIPTION OF THE SEVERAL VIEWS OF THE DRAWINGS

The invention will now be described with reference to embodiments shown in greater detail in the drawings.

FIG. 1b shows a partial section in a top view of the diagram in FIG. 1a;

FIG. 2b is a top view in partial section of the views in FIG. 2a;

FIG. 3b is a top view of the aircraft in FIG. 3a;

FIG. 3c is a section through the aircraft along arrow X in FIG. 3a;

FIG. 6b is a top view of the aircraft in FIG. 6a;

DETAILED DESCRIPTION OF THE INVENTION

Figure 1A:
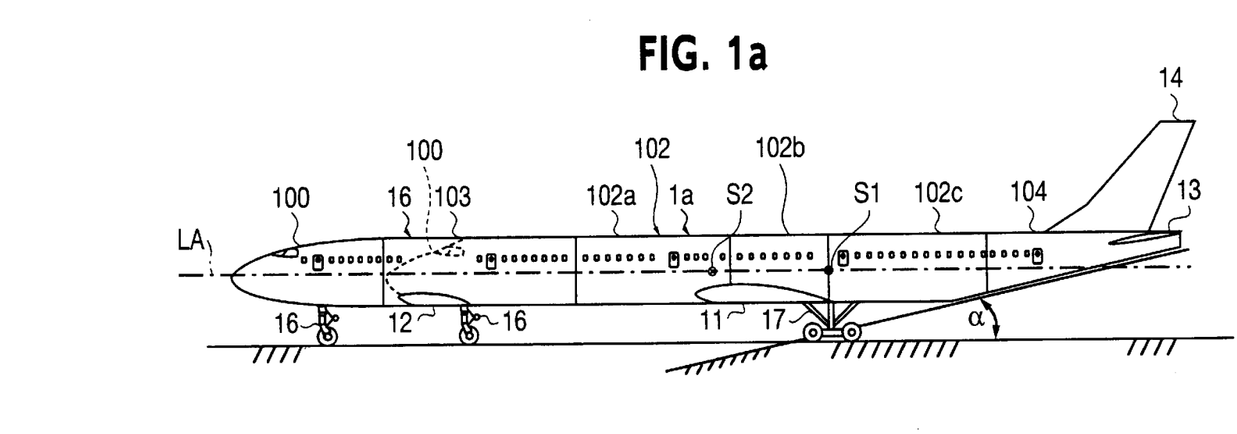
FIG. 1a is a side view of a known aircraft design as compared with an enlarged aircraft according to the invention.
Figure 1B:
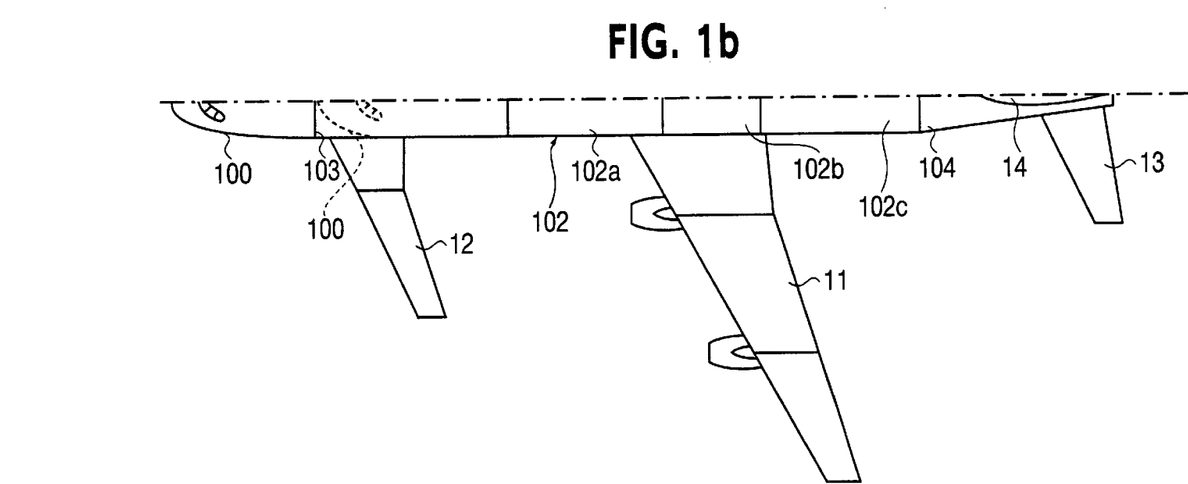

FIGS. 1a and 1b show a known aircraft design marked 1a as compared with an aircraft 1b with an enlarged carrying capacity, based on known aircraft design 1a.

The aircraft design 1a that serves as the basis is equipped in conventional fashion with a fuselage having a nose section 100, center section 102, and tail section 104, as well as airfoils 11 located in the vicinity of center section 102 near center of gravity S1 and with horizontal and vertical stabilizers 13 and 14, respectively, located in the vicinity of the tail section to produce steering moments. Airfoils 11 generate the necessary lift for flight and engines 15 are mounted on airfoils 11 in known fashion. Nose landing gear 16 is located at the nose section 100 and main landing gear 17 is located in the vicinity of center of gravity S1.

In order to improve this known aircraft design in terms of its carrying capacity it is proposed, starting with known aircraft design 1 a explained above, to stretch the fuselage by inserting an additional section 103 immediately adjacent to nose section 100 so that an aircraft 1b with an increased carrying capacity is created by additional section 103 being inserted between nose section 100 and center section 102. As a result of the stretching of the fuselage between nose section 100 and center section 102, the center of gravity of aircraft 1b is shifted forward as viewed in the direction of flight by comparison with center of gravity S1 of aircraft design 1a that serves as the basis, and is marked S2.

The additional lift for aircraft 1b required as a result of lengthening the fuselage by means of the inserted additional section 103 for aircraft 1b with an increased carrying capacity is provided by virtue of the fact that in the vicinity of additional section 103, additional airfoils 12, as viewed in the direction of flight, are located forward of airfoils 11 that serve as the main airfoils, with main airfoils 11 and main landing gear 17 being retained unchanged from aircraft design 1a that serves as the basis. Additional airfoils 12 in turn are taken from a suitable known aircraft design and therefore have an already designed and calculated wing profile.

Therefore it is clear that in order to increase the carrying capacity of aircraft design 1a that is known and serves as the basis, it is merely necessary to lengthen the fuselage forward of center of gravity S1 by inserting an additional section 103, resulting in the desired increase in carrying capacity and otherwise resorting to already calculated airfoils of additional known aircraft designs, so that no additional calculations and their associated high expense are required any longer in order to achieve the corresponding lift for aircraft 1b with an increased carrying capacity.

Herewith both the additional airfoils 12 and the main airfoil 11 are attached to the fuselage below the longitudinal axis of the fuselage which is designated as LA.

Since the fuselage of aircraft design 1a that serves as the basis is stretched only forward of center of gravity S1 to increase the carrying capacity, the takeoff angle a shown in FIG. 1a for aircraft 1b is retained unchanged from aircraft design 1a, so that this aircraft 1b with an increased carrying capacity is still capable of horizontal takeoff.

Figure 4:
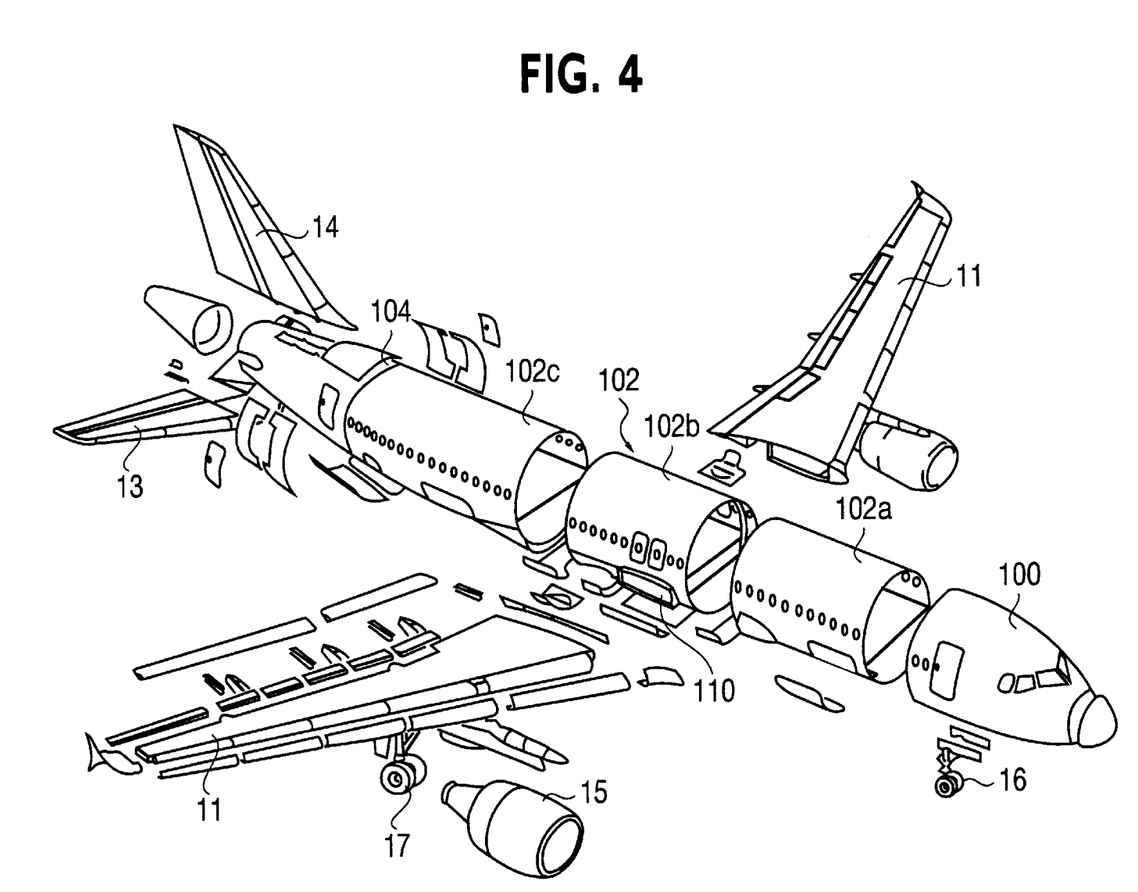
FIG. 4 shows the design of a known aircraft design with a fuselage with a modular design in an exploded view.

The increase in the size of the fuselage by inserting an additional section 103 between nose section 100 and center section 102, especially with construction of the fuselage from individual modules as is widespread today, can be achieved in simple fashion, as also indicated in FIG. 4. In the known aircraft design shown therein, which can serve for example as the basis for an aircraft 1b with an increased carrying capacity, nose section 100 is formed by a suitable module, tail section 104 is likewise formed by a suitable module, and center section 102 is formed by (in this case) three center section modules 102a, 102b, and 102c inserted in sequence. In addition, mounting elements 110 are provided on center section module 102b for attaching airfoils 11, which in the enlarged aircraft serve as the main airfoils.

To increase the carrying capacity of such a known aircraft design, one of center section modules 102a, 102b, and 102c is inserted between the module forming nose section 100 and the first center section module 102a, as viewed in the direction of flight. Advantageously an additional center section module 102b with mounting provisions 110 for airfoils is used so that mounting of additional airfoils 12 on this module that forms additional section 103 can be accomplished in simple fashion.

By inserting additional section 103 immediately adjacent to nose section 100, additional airfoils 12 are located as far forward as possible of the airfoils that serve as main airfoils 11, so that additional airfoils 12 and main airfoils 11 can influence one another as little as possible as far as the flow around them is concerned, and so that the inductive resistance of airfoils 11, 12 is reduced as a result.

Further reduction in the inductive resistance of the additional airfoils is achieved by virtue of the fact that these airfoils, derived from an aircraft design of suitable size, make additional expense for recalculation of the wing profile unnecessary, and the additional airfoils 12 from the aircraft design that serves as the basis are completely free of additional structures such as pylons, engines, etc., making them "aerodynamically clean."

As a result, an aircraft 1b with an increased carrying capacity is obtained by adding an additional section 103 with additional airfoils 12 fastened thereto, said additional section being capable of being developed and prepared for mass production within an extremely short development time and at low cost by resorting to parts already available from known aircraft designs, and with the initially mentioned overwhelmingly positive flight characteristics and improved economy being obtained as well.

In the following, using several examples of known aircraft design, the possibilities for increasing carrying capacity will be specified concretely.

EXAMPLE 1

As the basis according to FIGS. 1a and 1b, the known aircraft design, marked 1a, of the Airbus A 340-300 with 295 seats, a takeoff weight of 253,500 kg, an airfoil surface area of 362 $m^2$, and an airfoil load of 700 kg/$m^2$. By inserting an additional section 103, 16.4 m long, an aircraft 1b with an increased carrying capacity is created, with 439 seats. The additional lift required is produced by an additional airfoil 12 mounted on additional section 103, said foil(s) being adopted as already designed and calculated airfoils from the likewise known smaller aircraft design known as the Airbus A 321. Thus, the result is an aircraft 1b with an increased carrying capacity, with a total airfoil area of 484 $m^2$, but with an airfoil load of only 665 kg/$m^2$. From a comparison of the Airbus A 340-300 that serves as the basis with an airfoil load of 700 kg/$m^2$ in contrast to the previously described aircraft with an increased carrying capacity having an airfoil load of only 665 kg/$m^2$, it follows that aircraft 1b, with an increased carrying capacity, despite the increased number of seats, offers a load reduction of 126 kg/seat.

In this aircraft 1b with an increased carrying capacity, the airfoils that serve as main airfoils 11, the fuselage modules, the design and function of horizontal stabilizer 14 and vertical stabilizer 13, the position of main airfoils 11 and of main landing gear 17 on the fuselage, nose landing gear 16 and its location on nose section 100, as well as the horizontal takeoff mode have been adopted completely from the known aircraft design 1a serving as the basis, in this case the Airbus A 340-300. The pitch moment crated by the inserted additional section 103 is compensated by the positive lift provided by additional airfoils 12, while the residual moment, in other words the initial pitch moment of the aircraft design serving as the basis, is likewise compensated by the negative lift of the vertical stabilizer. The calculations show that in the case when additional airfoils 12 are made smaller than main airfoils 11, aircraft designs with an increased carrying capacity of up to 600 to 650 seats are feasible in which the horizontal takeoff mode is still possible.

EXAMPLE 2

Figure 2A:
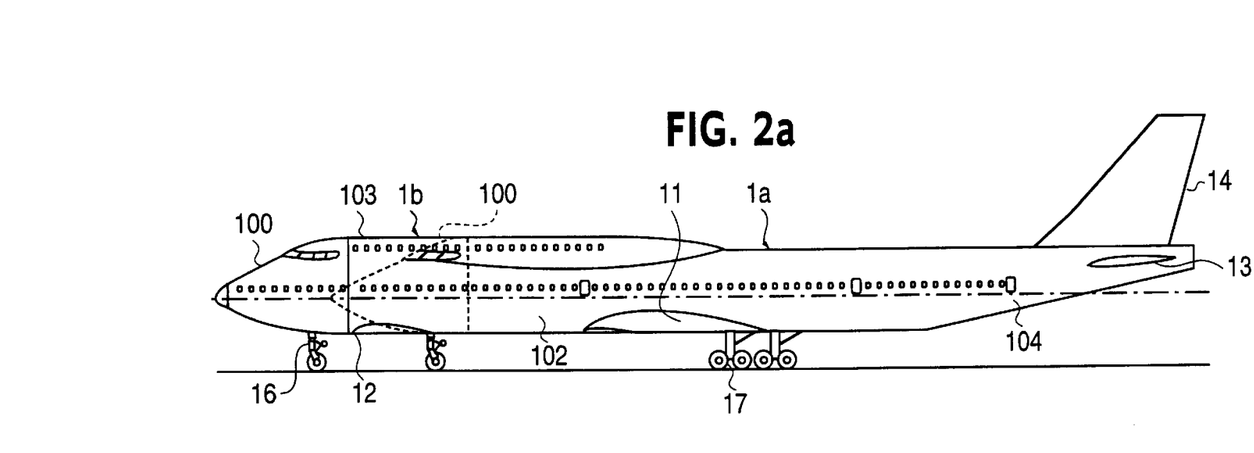
FIG. 2a is a side view of another known aircraft design compared with an aircraft enlarged according to the invention.
Figure 2B:
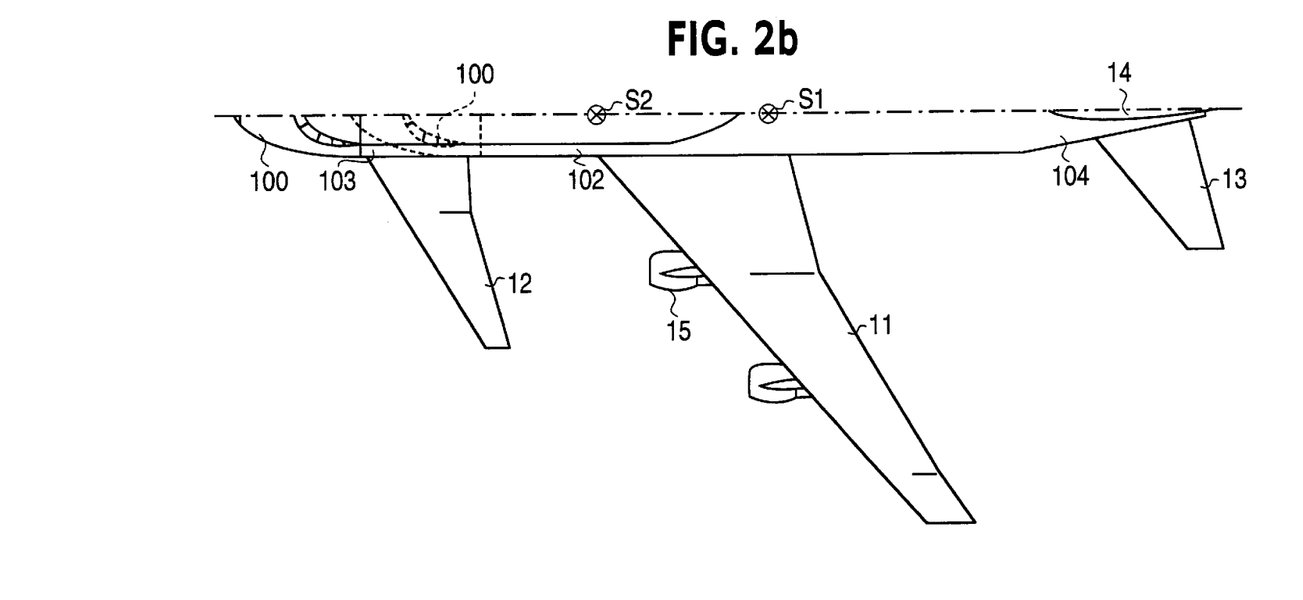

In this embodiment, the known aircraft design 1a of the Boeing 747-400 is used as the basis. By inserting an additional section 103 with a length of 9.34 m immediately adjacent to nose section 100, an aircraft 1b with an increased carrying capacity is created that offers 600 seats. The additional lift required is adopted unchanged from the main airfoils 11 adopted as basis 1a by applying additional airfoils 12 in the vicinity of additional section 103, with additional airfoils 12 constituting the airfoils of the additionally known aircraft design known as the Boeing 757.

EXAMPLE 3

Figure 3A:
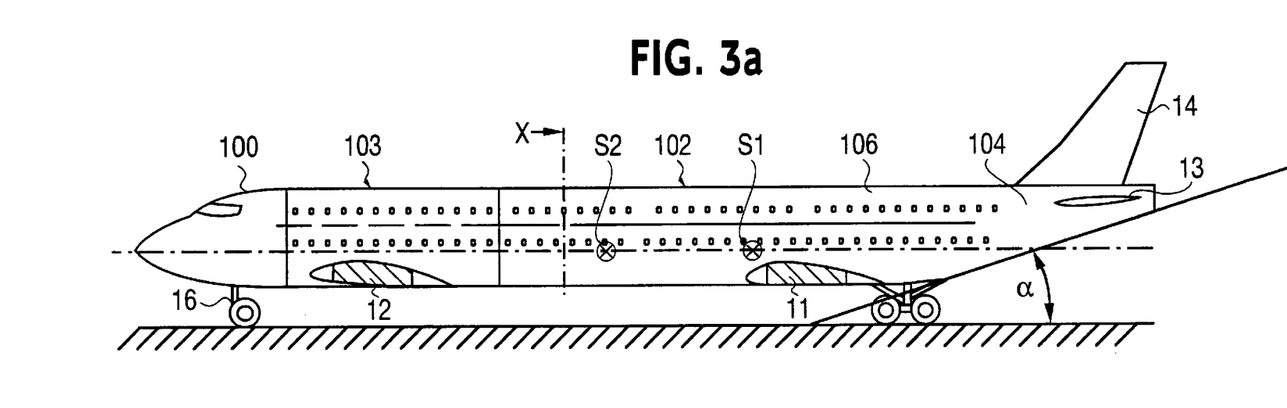
FIG. 3a is a side view of another aircraft enlarged according to the invention.
Figures 3B, 3C:
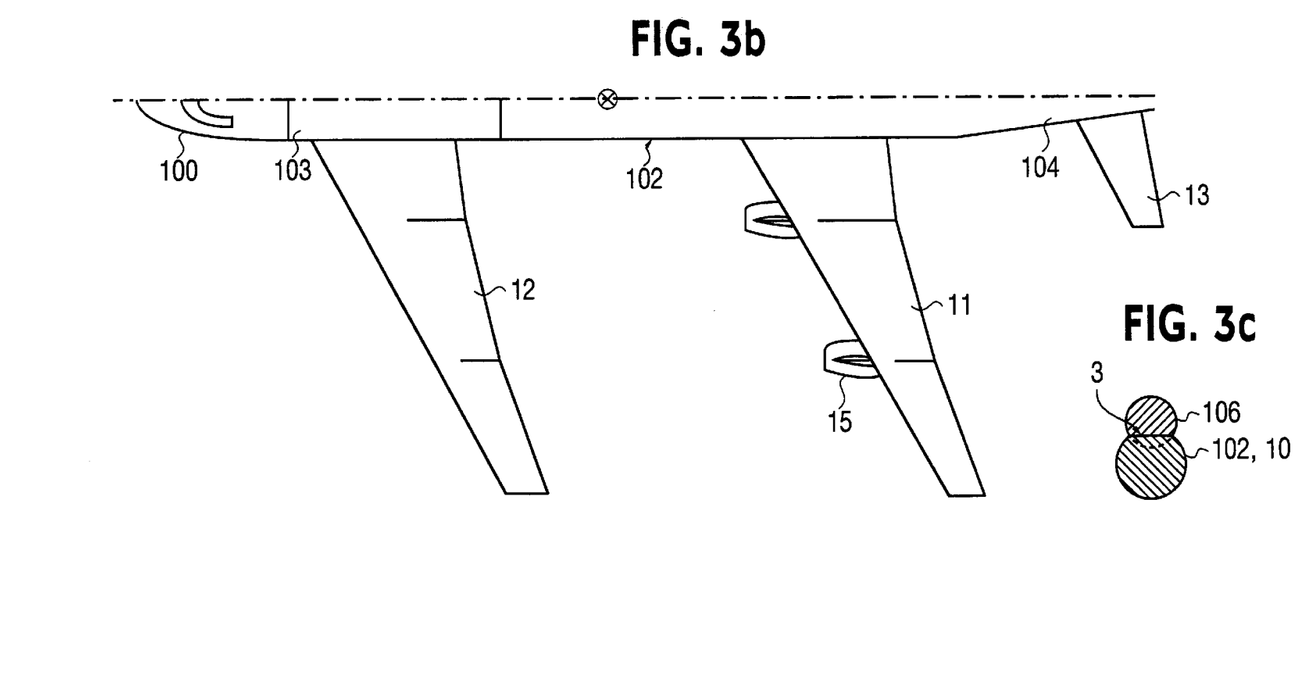

In a modification of Example 1, the familiar aircraft model known as the Airbus A 340-300 is selected as the basis, said model having a fuselage stretched forward of center of gravity S1 by adding an additional section 103. To further increase the carrying capacity, the fuselage has also been made with two levels, with an upper deck 106 extending over the entire length of the fuselage. To save on development costs, this upper deck 106 can likewise be adopted from the fuselage modules of another known aircraft design. In the present embodiment, upper deck 106 is assembled on the basis of fuselage modules of the smaller aircraft model known as the Airbus 321 so that the figure-eight-shaped fuselage cross section shown in FIG. 3c of the aircraft design enlarged in this fashion is obtained. The additional lift required for an aircraft enlarged in this manner is generated by additional airfoils 12 which are mounted on additional section 103 and are of the same size as the ones that serve as main airfoils 11 and have been adopted unchanged from the aircraft design known as the Airbus 340-300 serving as the basis. Here again, by virtue of the extensive use of parts from an already known aircraft design, the development costs and the attendant efforts are considerably reduced.

EXAMPLE 4

Figure 5A:
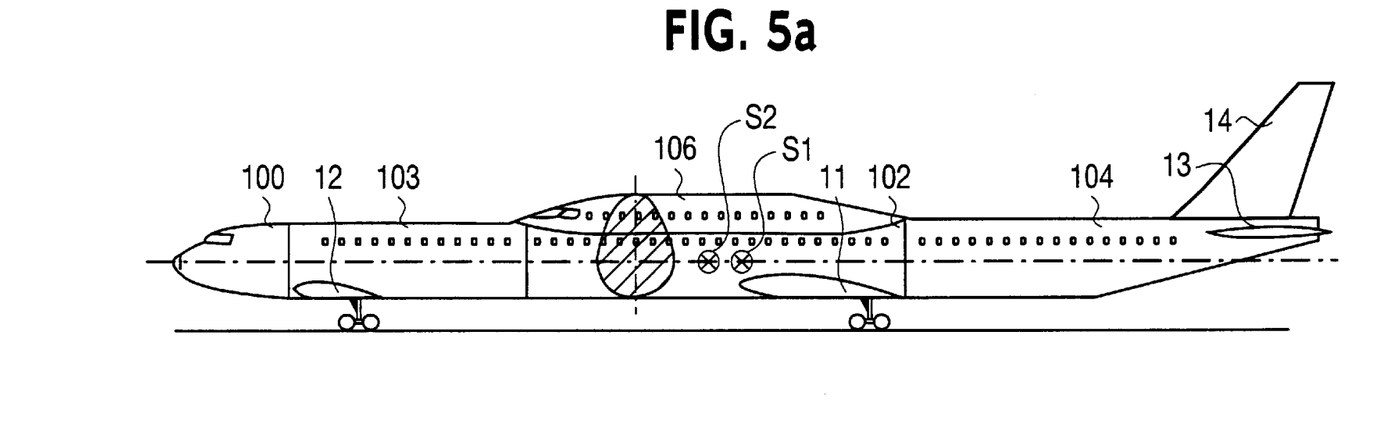
FIG. 5a is a side view of another embodiment of the invention.

FIG. 5a shows another version of the aircraft design with an enlarged carrying capacity described under Example 1. In this case, starting with a known aircraft design of the A340-300 type, the fuselage has been stretched by inserting an additional section 103 and the carrying capacity has also been increased in the vicinity of center of gravity S2 by providing a second level with upper deck 106 over 30% of the total fuselage length. Upper deck 106 is arranged symmetrically with respect to center of gravity S2 of the aircraft design provided with a stretched fuselage so that the position of center of gravity S2 is not affected and no influence on the flight characteristics by comparison with Example 1 needs to be accepted. It has also been found that locating upper deck 106 symmetrically with respect to center of gravity S2 and in the vicinity of center section 102 of the aircraft produces an especially low inductive resistance, which has an advantageous effect on the economy of an aircraft thus equipped with an increased carrying capacity. The bilevel fuselage area has the slightly egg-shaped fuselage cross section indicated. The aircraft shown in FIG. 5a has a takeoff weight of 338,800 kg and a total of 505 seats. The necessary lift is provided by the wing areas adopted unchanged at 362 m$^2$ as main airfoils 11 from the Airbus A 340-300 serving as the basis and by the airfoils mounted as additional airfoils in the vicinity of additional section 103 and adopted from the known aircraft design known as the Airbus 321, so that a total airfoil area of 484 m$^2$ is obtained as in Example 1.

EXAMPLE 5

Figure 5B:
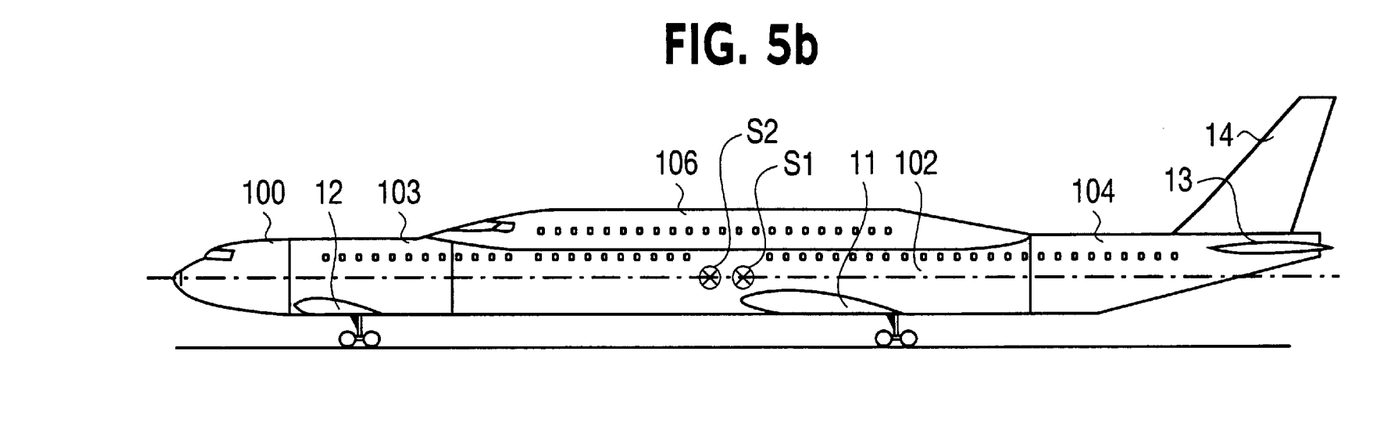
FIG. 5b is another embodiment of the invention in a side view.

In FIG. 5b, by comparison with FIG. 5a, an aircraft designed with a stretched upper deck 106 and having an enlarged carrying capacity is shown, with upper deck 106 covering 50% of the fuselage length and again located in the vicinity of center section 102 symmetrically with respect to center of gravity S2. This aircraft with an increased carrying capacity has a takeoff weight of 340,000 kg and 601 seats, and an unchanged total airfoil area of 484 m$^2$ as provided by main airfoils 11 of the Airbus A 340-300 and additional airfoils from the Airbus A 321.

EXAMPLE 6

Figure 6A:
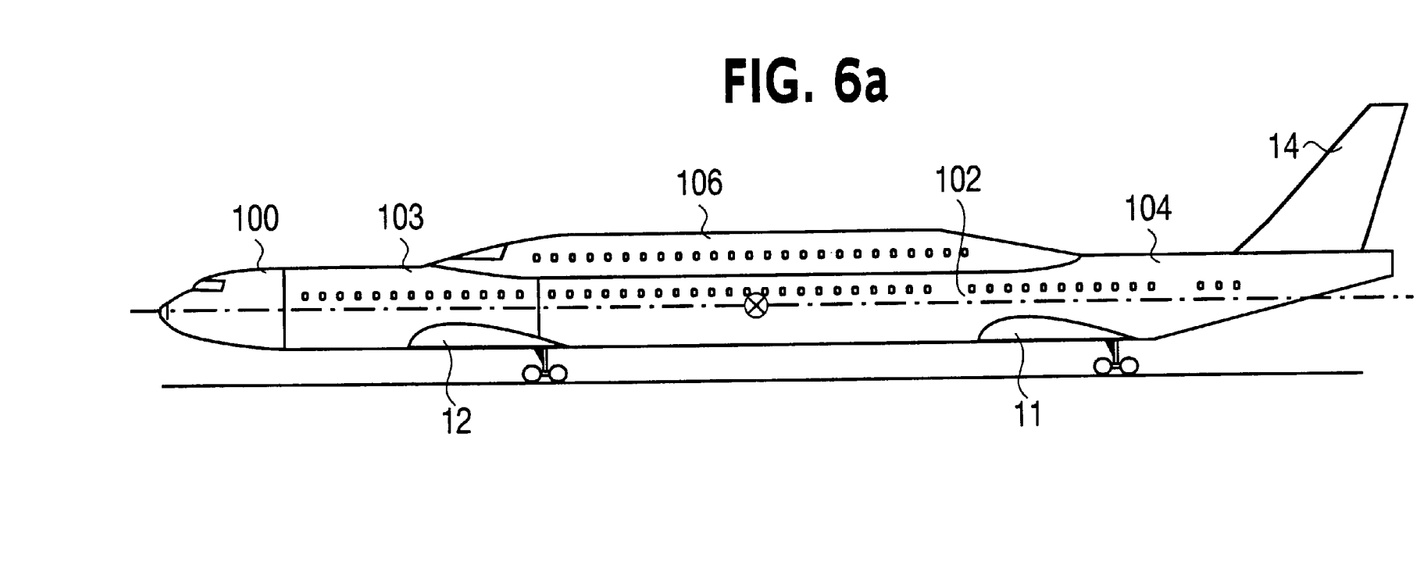
FIG. 6a is a side view of another aircraft according to the invention.
Figure 6B:
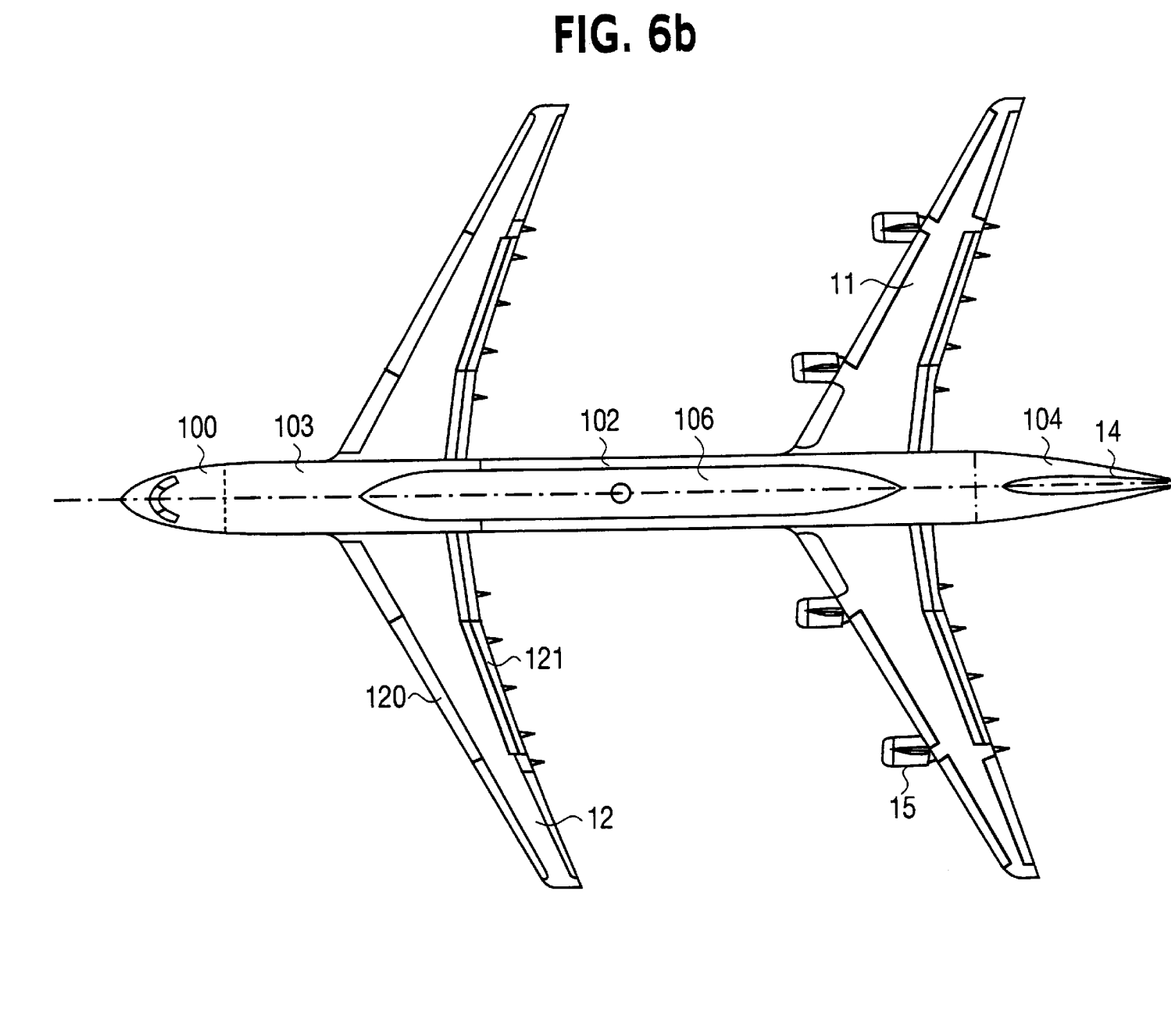

FIGS. 6a and 6b show an aircraft with an increased carrying capacity which has the same fuselage design as Example 5 shown in FIG. 5b. However, as is especially evident from the top view shown in FIG. 6b, not only are main airfoils 11 adopted unchanged from the known aircraft model known as the Airbus A 340-300 used as the basis but additional airfoils 12 have also been adopted from the known aircraft model known as the Airbus 340-300, so they are of the same size and the same shape as main airfoils 11. However, by comparison with main airfoils 11, aerodynamically disturbing structures such as engines 15 and pylons and the like have been removed from additional airfoils 12. The aircraft with this design and having an increased carrying capacity has a takeoff weight of 488,700 kg with 625 seats, lifted by a total airfoil area of 362 m$^2$ on main airfoils 11 and additional airfoils 12, in other words a total of 724 m$^2$. The additional airfoils 12 are also provided on their leading and trailing edges with flaps that extend over the entire width of the airfoil, such as Kruegger flaps 120 and ailerons 121. Thus, in addition to the necessary lift and additional airfoils 12, steering moments for the aircraft can be produced as well, while elevator 13 required in the vicinity of tail section 104 in a conventional aircraft can be eliminated. In this design, without an elevator the inductive resistance and wave drag of the airflow are further reduced and the balancing resistance is considerably reduced during cruising flight. In all, this results in an increase in the lift/drag ratio of at least 20–25%, which together with the above-mentioned weight decrease per seat ensures that the economy of the aircraft with increased carrying capacity is increased considerably over the known aircraft design that serves as the basis.

EXAMPLE 7

Figure 7A:
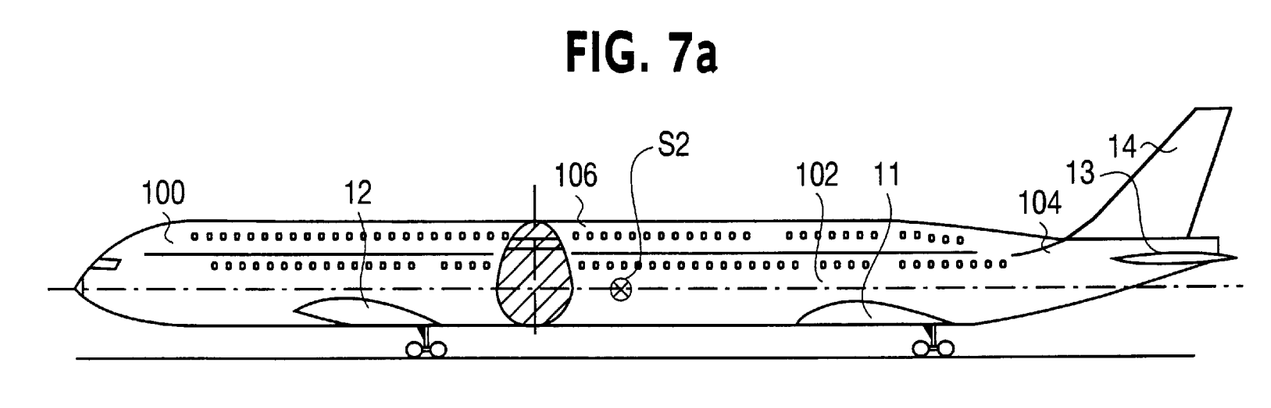
FIG. 7a is another embodiment of the invention in a side view.
Figure 7B:
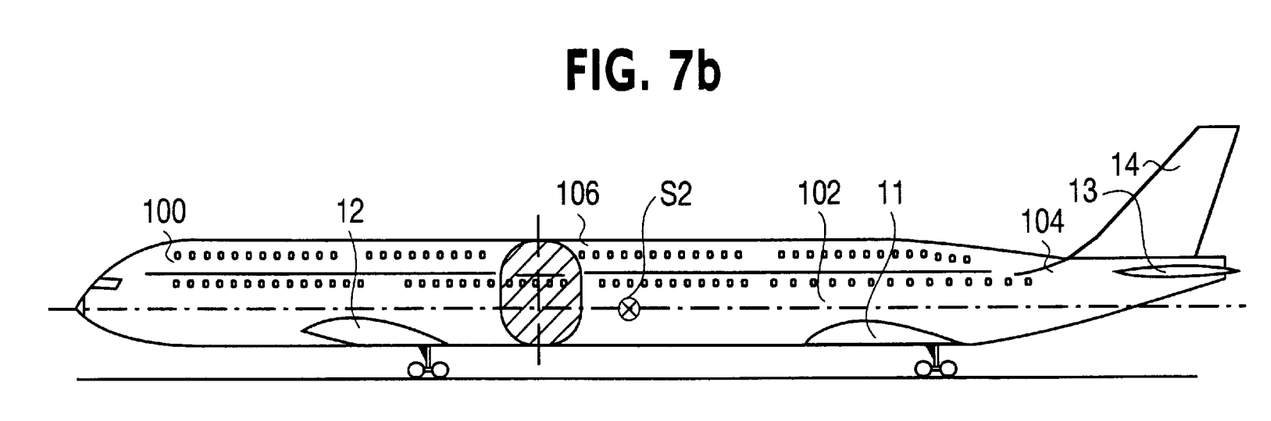
FIG. 7b is another embodiment of the invention in a side view.

In FIGS. 7a and 7b, aircraft with increased carrying capacity based on a known aircraft model known as the Airbus A 340-300 are shown, with main airfoils 11 and additional airfoils 12 of the same size. The fuselage is designed for further increasing the carrying capacity with a bilevel design extending over its entire length, with an upper deck 106, so that once again a symmetrical position relative to center of gravity S2 is achieved, but at the same time the carrying capacity is maximized. In the embodiment shown in FIG. 7a, upper deck 106 is composed of fuselage modules of a smaller known aircraft design, the Airbus A 321, producing an aircraft with an increased carrying capacity that has a takeoff weight of 506,800 kg and 800 seats and a total airfoil area of 724 m$^2$, with the egg-shaped fuselage cross section shown in the drawing.

By assembling upper deck 106 from fuselage modules of a known aircraft design, the Airbus A 340-300 used as the basis, a fuselage is obtained that has the same area on both levels, so that an aircraft with an increased carrying capacity and a takeoff weight of 506,800 kg, 900 seats, and a total airfoil area of 724 m$^2$ as well as a symmetrical fuselage cross section is obtained, as shown in FIG. 7b.

In any event, as a result of the proposed increase in the size of the fuselage of a known aircraft design that serves as the basis by insertion of an additional section forward of the center of gravity and possibly having a fuselage with two levels located at least areawise symmetrically with respect to the center of gravity, an aircraft with increased carrying capacity is obtained which can be readied for mass production by predominantly using parts of aircraft designs that are already designed and calculated, with a considerable reduction of development costs, and highly advantageous flight characteristics are obtained as well, with increased economy.

We claim:

1. Aircraft for carrying passengers and/or freight based on a known aircraft design, with a fuselage having a nose section, center section, and tail section and with airfoils mounted on the center section close to the center of gravity of the aircraft and calculated according to the required lift, and with vertical and/or horizontal stabilizers provided in the vicinity of the tail section to produce stabilizing and steering moments, characterized in that in order to increase the carrying capacity of the aircraft on the basis of the known aircraft design, the fuselage of said aircraft is stretched by means of an additional section inserted between the nose section and the center of gravity of the aircraft, and the additional section, as viewed in the direction of flight, is provided ahead of the airfoils of the aircraft design that serve as the main airfoils, with airfoils that serve as additional airfoils, with previously designed and calculated airfoils of suitable size from a known aircraft design being used as the additional airfoils, and in that the fuselage of the aircraft is composed of modules and comprises a module forming the nose section, a module forming the tail section, a plurality of modules forming a center section, and a module forming the additional section, with the main airfoils being mounted on one of the modules that form the center section.

2. Aircraft according to claim 1, characterized in that the additional section with the additional airfoils is designed so that it directly abuts the nose section.

3. Aircraft according to claim 1, characterized in that the effective wing surface area of additional airfoils is smaller than or at most the same size as the effective wing area of the main airfoils.

4. Aircraft according to claim 1, characterized in that the additional airfoils contribute at least 15% and preferably at least 20% of the total lift of the aircraft.

5. Aircraft according to claim 1, characterized in that both lifting and steering moments for the aircraft can be produced by means of the additional airfoils.

6. Aircraft according to claim 1, characterized in that for the increase of lift and lift/drag ratio the additional airfoils, as viewed in the direction of flight, are equipped at their leading edges and/or trailing edges with wing flaps and/or leading edge flaps (Kruegger-flaps) that extend over the entire width of the additional airfoils.

7. Aircraft according to claim 1, characterized in that the additional airfoils and the main airfoils are provided below the longitudinal axis of the fuselage of the aircraft.

8. Aircraft according to claim 1, characterized in that the additional airfoils, the main airfoils and the horizontal control surfaces have different angles of incidence in cruising configuration of the aircraft with respect to the longitudinal axis of the fuselage in such a manner that the additional airfoils have a larger angle of incidence as the main airfoils and the main airfoils have a larger angle of incidence than the horizontal control surfaces, whereby the angles of incidence of the horizontal control surfaces in preferably 0°.

9. Aircraft according to claim 1, characterized in that the top edge at the outer end of the additional airfoils is provided on the same or a higher level as the surface of the main airfoils.

10. Aircraft according to claim 1, characterized in that the additional airfoils are pivoted around their longitudinal axis to the fuselage in such a manner that the angle of incidence of the additional airfoils is enlargeable at take off and/or landing of the aircraft.

11. Aircraft according to claim 1, characterized in that the additional airfoils have an enlarged transversal wing angle "V" of preferably 5 to 10° in comparison with the main airfoils.

12. Aircraft according to claim 1, characterized in that the middle distance between the main airfoils and the additional airfoils is at least five fold of the local width of the additional airfoils.

13. Aircraft according to claim 1, characterized in that the additional airfoils have a wing spread that in size lies between the wing spread of the main airfoils and the wing spread of the horizontal control surfaces.

14. Aircraft according to claim 1, characterized in that, in order to increase the carrying capacity, the fuselage is formed, on the basis of known predetermined aircraft designs, with two levels dividing at least the center section into an upper level and a lower level.

15. Aircraft according to claim 14 characterized in that, in order to increase the carrying capacity, the fuselage is formed, on the basis of know predetermined aircraft designs, with two levels dividing at least the additional section into an upper level and a lower level.

16. Aircraft according to claim 15, wherein the center and additional sections are divided into two levels symmetrically with respect to the center of gravity.

* * * * *